US012706971B2

(12) United States Patent
Srivastava et al.

(10) Patent No.: US 12,706,971 B2
(45) Date of Patent: Aug. 11, 2026

(54) SYNCHRONIZATION OF DATA IN AN ASYNCHRONOUS ENVIRONMENT

(71) Applicant: T-Mobile USA, Inc., Bellevue, WA (US)

(72) Inventors: Nilay Srivastava, Sammamish, WA (US); Michael Engan, Bellevue, WA (US); Mir Md Rashedul Hasan, Newcastle, WA (US); Pablo Medeiros Dominguez, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/204,252

(22) Filed: May 31, 2023

(65) Prior Publication Data

US 2024/0406260 A1 Dec. 5, 2024

(51) Int. Cl.
*H04L 67/1095* (2022.01)

(52) U.S. Cl.
CPC ................................ *H04L 67/1095* (2013.01)

(58) Field of Classification Search
None
See application file for complete search history.

(56) References Cited

U.S. PATENT DOCUMENTS 10,425,230 B1 * 9/2019 Tang ....................... G06F 21/64
2010/0268844 A1 * 10/2010 Quinlan ................ G06F 16/273
709/238
2017/0141926 A1 * 5/2017 Xu ........................ H04L 9/3066
2019/0141126 A1 * 5/2019 McFall .................... G09B 5/00
2019/0303541 A1 * 10/2019 Reddy ..................... G06F 21/64
2019/0303623 A1 * 10/2019 Reddy ....................... G06F 8/71
2019/0305959 A1 * 10/2019 Reddy ....................... G06F 8/73
2023/0171116 A1 * 6/2023 Appel .................. H04L 9/3236
713/178
2024/0095730 A1 * 3/2024 Teodor ...................... H04L 9/50

FOREIGN PATENT DOCUMENTS

WO WO-2021249715 A1 * 12/2021 ........... G06Q 20/223

OTHER PUBLICATIONS

Hillmann et al., "Selective Deletion in a Blockchain", Nov. 1, 2020, IEEE, 2020 IEEE 40th International Conference on Distributed Computing Systems (ICDCS) (pp. 1249-1256) (Year: 2020).*

* cited by examiner

*Primary Examiner* — Davoud A Zand
(74) *Attorney, Agent, or Firm* — Lee & Hayes, P.C.

(57) ABSTRACT

Systems and methods discussed herein are directed to a method within a wireless communication network that includes asynchronous data systems. The method may include a first node within an asynchronous data network receiving from a source node within the asynchronous data network, a data packet comprising a header, wherein the header comprises a hash indicating current data. The first node may compare the current data with stored data stored by the first node. Based at least in part on comparing the current data with stored data stored by the first node, the first node requests synchronization of the first node with the source node.

16 Claims, 5 Drawing Sheets

SYNCHRONIZATION OF DATA IN AN ASYNCHRONOUS ENVIRONMENT

BACKGROUND

As part of larger and more complex environments, e.g., telecommunication environments, data is often replicated in more than one system. Keeping a single source of data records may not always be feasible for performance, legality, privacy, and complexity reasons. In a telecommunications network, there are critical data elements that are always needed in most systems. However, most data, regardless of the environment, is almost always uniquely associated to a form of identity.

Different systems are typically interested in different pieces of data. For example, a system dealing with mobile device provisioning may want to know phone numbers, international mobile subscriber identities (IMSIs). Another system, such as, for example, a mobile network operator website, may want to know information about a user, e.g., email, first name, last name, etc. Security systems may want to know information about authenticators. However, no one system generally needs to know everything.

A common way to ensure systems have the latest and greatest data is through lookups from a source of record or an asynchronous event notification model. Depending on expectations of real-time request/responses for the system experience, either method may be used. Systems may also cache data for higher performance and rely on events to keep these cache's up to date.

Due to failures in systems, specifically in asynchronous models of data distribution, different systems may eventually diverge in accuracy. This eventual divergence is almost inevitable without a guaranteed distribution method, which requires a form of unique tracking for each system. This is very complex and customized. Auditing systems for accuracy are quite difficult without this as it is often quite difficult to export entire databases and compare them, especially between formats and technologies, e.g., structured query language (sql), non-SQL (nosql), caches, queues, etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques and architecture are described herein provide an algorithm to hash key data elements in a loosely defined structure that allows for a lightweight and quick method to validate data across systems. The algorithm concept has multiple benefits that allows systems to quickly determine if such systems have an accurate representation of data and helps improve scaling and/or performance by quickly determining if the systems need to update their data. This can also be thought of as a global key that determines if all the systems have the same key with the most-up-to-date information. While the techniques and architecture described herein are applicable to all types of environments that store data in multiple systems, the techniques and architecture are described herein with respect to telecommunication networks, and more particularly, with respect to mobile communication networks, only for description purposes and is not to be limiting.

Provisioning systems for mobile communication networks generally start by billing at the beginning. Currently, activations start through a billing account that propagates to network nodes of a mobile communication network. Such network nodes may include, for example, the home location register (HLR), short message service center (SMSC), multimedia message service center (MMSC), gateway mobile location center (GMLC), Internet protocol multimedia subsystem (IMS) Core, identity and access management (IAM), network access point (NAP), etc.

Such provisioning requests generally flow through an orchestration layer to attempt to keep all the systems synchronized. This is typically a gateway solution. In practice, if there is an outage on a single system, it may not be synchronized. Even with an event queue that guarantees delivery, each system may or may not properly process the request, which can lead to a divergency in data consistency. The reality is many gateway systems generally act as an asynchronous system to accept a request and orchestrate separately to other systems.

Other times, once data is provisioned, keeping everything synchronized is often done through asynchronous notifications such as changes to emails or billing addresses or permissions over billing accounts. There is an endless variety of information that needs to get sent to other systems. The endless variety of information also diverges in terms of data consistency over time. Notifications are typically best effort systems and often see a divergence of data consistency. Complex systems have microservices that may accept notifications and still intermittently fail internally to persist data correctly.

Figure 1A:
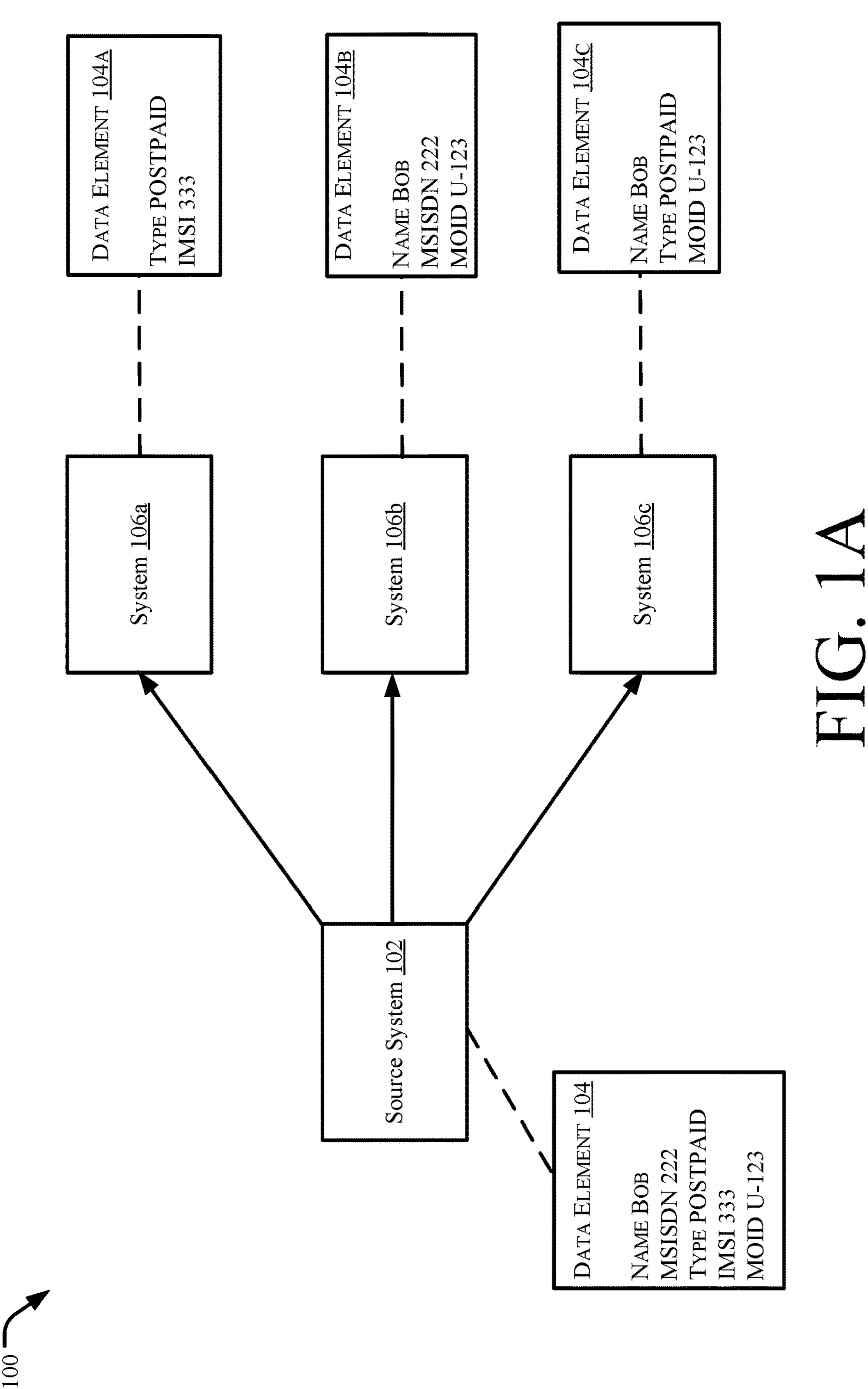
FIGS. 1A and 1B schematically illustrate an example form of distributed data from a single source system on multiple systems, in accordance with various configurations.

Large scale systems with 1000's of requests a second may often see a certain failure rate due to multiple reasons and thus the concept of an asynchronous system may practically be best effort regardless of a guaranteed delivery approach. To illustrate this problem, FIG. 1A schematically illustrates an example form 100 of distributed data from a single source system 102 on multiple systems 106.

As an example, source system 102 is a system of record for data element 104. However, systems 106*a*, 106*b*, and 106*d* each require different elements of information from system 102, e.g., different forms 104*a*, 104*b*, and 104*c* of data element 104, respectively. Typically, the source system 102 needs an orchestrator to help manage which data elements get provisioned to each of the other systems 106*a*, 106*b*, and 106*d*. An important takeaway is that systems 106*a*, 106*b*, and 106*d* may not support the data model that system 102 supports. This is a simple example, but with complex relationships with the data model, it is unrealistic to expect every other system to support the same data model, especially if system 102 is responsible for billing and systems 106*a*, 106*b*, and 106*c* are focused on very specific functionality. As is known, an orchestration system (not shown) may use a queuing behavior to maintain synchronization. Since system 102 cannot afford to wait for a scalable distribution to each downstream system 106*a*, 106*b*, and 106*c*, a queue helps avoid performance problems. This is a common way to attempt to help distribute data to different systems. This is susceptible to failures where system 102 may reject the request and thus the entire arrangement may be out of synchronization.

Normally, system 106*c* should try to reconcile the data, but this is not always built into large scale distribution models, and it is expensive to maintain an overwatch process to find faults and failures. If the orchestration layer queuing has issues, messages may be lost and although recovery of data is possible, it is not always feasible without impacting real-time traffic. Network issues may also present themselves between the orchestrator and sub systems. This can cause a desynchronization of data which is not easily repaired without manual intervention. Additionally, order typically matters. Thus, replaying events is also sometimes difficult in the case that data that is more recent should not be overwritten. Not every system has logic for every data element to have a change timestamp to avoid this situation.

Another asynchronous model to notify systems of changes may perform synchronization through event queues. In this example, an integrated data processing (IDP) or IAM platform may notify multiple systems with an event queue. The queue may then be read by other systems such as, for example, a customer care database, marketing system, a notification engine, etc. Each has a unique role and may not be a real-time consumer of this data.

Thus, while using a queue may make sense, such use is still limited to an asynchronous flow and has potential issues with becoming de-synchronized. A missed notification for the notification engine is not an issue, however if marketing does not get the correct email address, that is a potential issue. A customer care database may be even more critical to ensure it has the correct names to validate a customer. Once again, it is nearly impossible for a system to know an event is missed, which means the system will not have the latest information. Thus, the problem being summarized here is pointing to problems with asynchronous architecture. However, that does not mean the architecture does not work. It is an elegant solution to trying to avoid too much logic and tight integration with source systems. Source systems should not play a role to control every other system in the network.

To address this problem, it is important to accept that divergence of data consistency may happen. This is almost inevitable through network issues, internal failures, outages, hardware failures, etc.

A good way to know if data is stale is to have a reference data identifier for the entire structure of the data element. For simplicity, it may be referred to herein as a "reference provisioning hash," which may, for example, have a format such as:

TABLE 1

| UserID | Email | MSISDN | ISMI | Billing Account | Name |
|---|---|---|---|---|---|
| U-123 | null@mobile.com | 1112223333 | 99988877700 | 100100 | John doe |

An MD5 hash of this may thus become:

| |
|---|
| "U-123:null@mobile.com:1112223333:99988877700:100100:John doe" |
| 7B3ECBD6CC439AB542985835BA3EB036 |

This hash is now a secure data element that cannot be reversed. This provides safety when sharing this hash. The hash may be any number of key data elements, so if any of these elements change, the corresponding hash will also change. When the hash is sent as a header or API attribute—this allows for any system to reference what they know as the latest set of data. This presents an issue if two systems think their hash is the latest data.

Adding a timestamp to the hash is all that is needed to know the latest version of data received. As an example:

"U-123:null@mobile.com:1112223333:99988877700:100100:John doe"

With current timestamp (in epoch):

1657438324

As an example, this header may be referred to as UID_SYNC and the header value may be in the form of:

UID_SYNC: 7B3ECBD6CC439AB542985835BA3EB036_1657438324

If any system has an older date, the system will know if their hash is different and if it is no longer accurate. This provides a way to determine the latest set of data.

If different systems need different pieces of information, then having an index of what is being hashed has value. Adding a key will allow a way to determine which elements are being hashed. A key may be added at the end of the sync string, which allows easy rebuilding of a hash for verification if needed and allows for backwards compatibility changes if keys are changed or the order is changed.

Specific letters and combinations may be reserved such as, for example: UID.E.M.I.B.N, respectively represent the userid, email, msisdn (mobile station international subscriber directory number), imsi (international mobile subscriber identity), billing account, and name. The format then becomes:

UID_SYNC: 7B3ECBD6CC439AB542985835BA3EB036_1657438324_UID.E.M.I.B.N

The format is a hash_timestamp_key separated by underscores. The key is separated further by periods.

In configurations, this header may be optionally encrypted for better security, although it is not necessary. Alternatively, the key may be encrypted to help secure the type of information being shared. For the purposes of this concept, examples without encryption may be considered. However, encrypting does not change the concept or design at all. A header is preferable due to the simplicity of not breaking any API specifications as most web servers generally ignore extra headers if the web servers do not require it. This can be sent as a cookie as well for browser-based communication, along with a sessionid if required. In some configurations, a token may a better place to store this, as will be described further herein.

Figure 1B:
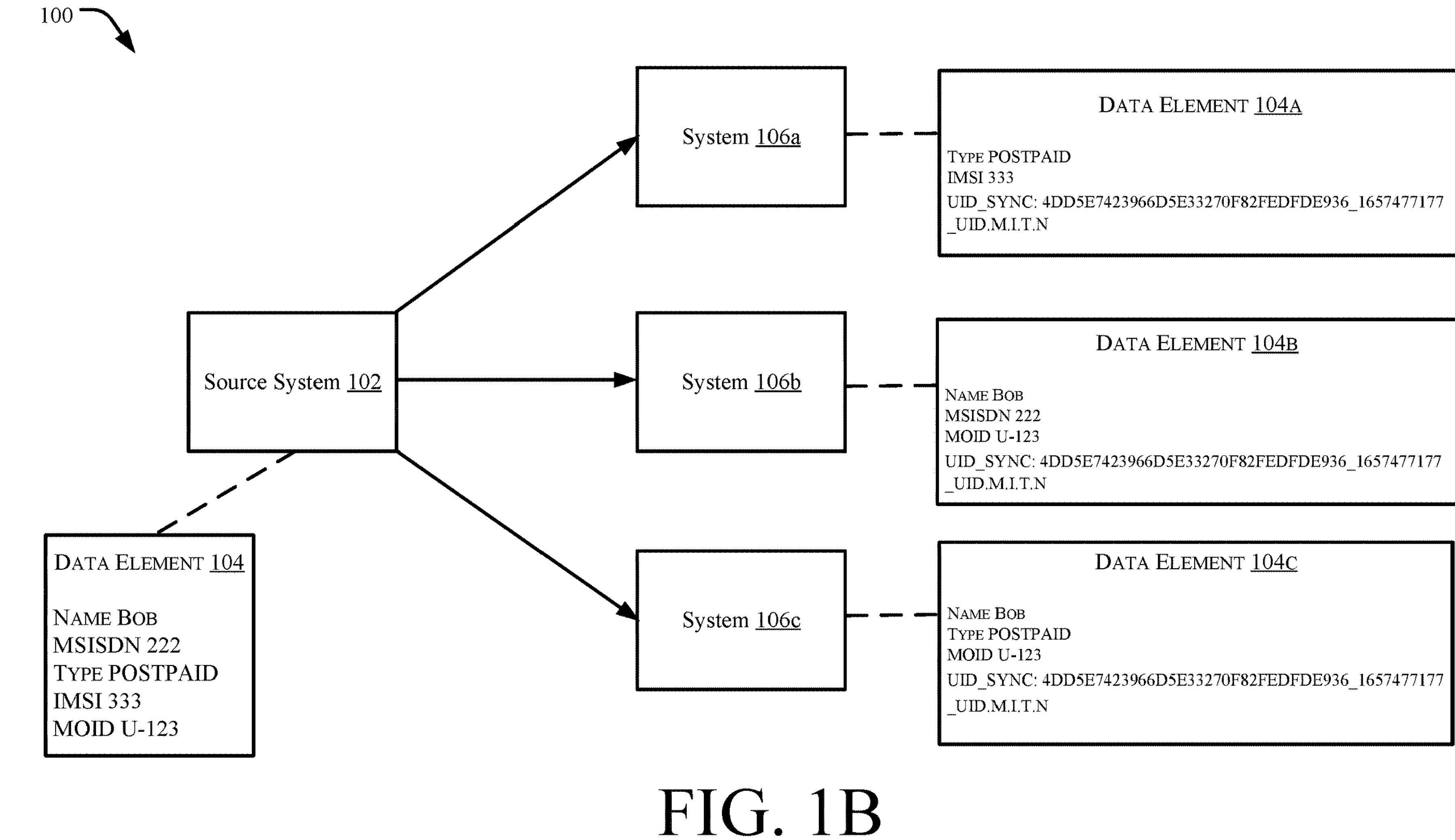

FIG. 1B schematically illustrates the example form 100 of distributed data on multiple systems from a single source system implementing the techniques and architecture described herein. Based on the example form 100 of FIG. 1A, the hash for data element 104 becomes:

Key - UID.M.I.T.N - MOID, MSISDN, IMSI, Type, Name
Hash - 4DD5E7423966D5E33270F82FEDFDE936 - U-123:222:333:POSTPAID:Bob
Timestamp - 1657477177 - Sunday, July 10, 2022 6:19:37 PM
UID__SYNC: 4DD5E7423966D5E33270F82FEDFDE936__1657477177__UID.M.I.T.N This is generally a simple concept so that systems 106*a*, 106*b*, and 106*c* all know the latest reference of data. If system 102 sends a transaction out of order, it can be discovered to avoid an issue based on the timestamp.

If system 102 sends an update on an attribute other than the critical attributes, for example, an international mobile equipment identity IMEI (device model change), then the hash may indicate to each of the other systems 106*a*, 106*b*, and 106*c* if they have the latest information for the identity. Example sequence of updates:

Update name: Joe
Update MSISDN: 444
Update IMEI 1001001

If system 106*b* missed the MSISDN update, during the IMEI update, it will know it is out of synchronization. Thus, the techniques and architecture described herein allows critical information to be an indicator of a synchronization issue. This helps catch a missed critical update so that the system 106*b* can look to resynchronize itself without undue stress on any middle layer or source system 102. Keep in mind that in an asynchronous model, source system 102 cannot know the state of the downstream systems, e.g., a billing system in the telecommunication world.

In the previous example, a set of core elements were used as the key to the hash. Not all users may desire the same level of detail. This is specific to flows where information in a token may be hashed. An example may be in an OAUTH2 or OpenID representation of a token that includes specific scopes of data about an identity.

In configurations, a MOID (mobile network operator ID) in a mobile network may use ID tokens that are signed with specific details. An example of this may be:

eyJhbGciOiJSUzI1NiIsInR5cCI6IkpXVCIsImtpZCI6IlZVRlVSRUZVTFRJd01qTT0
ifQ.eyJpYXQiOjE2NTc1NjcwNDcsImV4cCI6MTY1NzU3NDI0NcwiaXNzIjoiaHR0
cHM6Ly91YXQuYnJhc3MuYWNjb3VudC50LW1vYmlsZS5jb20iLCJhdWQiOiJN
WVRNTyIsIkFUIjoiMTQuVVNSLlUwWmNvclBzQzY1MXVMMlNSIiwic3ViIjoi
VS0wYzU0MDE1Ni1jNjAwLTRiMDMtODQ5YS1mNmE4ODI5OWJlMmIiLCJhY
3IiOiJsb2EyIiwiYW1yIjpbInBhc3N3b3JkIl0sInVzbiI6ImY3NGUyZmEzMmUxND
MzMGEiLCJlbnRfdHlwZSI6ImJhc2ljIiwiZW50Ijp7ImFjY3QiOlt7ImlkIjoiNDI1MzI
2IiwidHN0IjoiSVIiLCJiaWdfYmFuIjpmYWxzZSwibGluZXMiOlt7InBobnVtIjoiND
I1MzI2Otc0NCIsImFjdGl2YXRpb25EYXRlIjoiMjAyMS0wOC0xMVQxOTo0Mtox
NloiLCJhY2NvdW50VHlwZVN1YlR5cGUiOiJTTCIsInIiOiJSLERMLEQifSx7InBo
bnVtIjoiNDI1MzI2Otc0NCIsImFjdGl2YXRpb25EYXRlIjoiMjAyMi0wNS0zMVQx
OTo1MDowOVoiLCJhY2NvdW50VHlwZVN1YlR5cGUiOiJJUiJ9LhsicGhudW0iOi
I0MjUzMjY5NzQ5IiwiYWN0aXZhdGlvbkRhdGUiOiIyMDIyLTA1LTE2VDE5OjQ
1OjEyWiIsImFjY291bnRUeXBlU3ViVHlwZSI6IklSIiwiciI6IkNBViJ9XX1dfX0.vx
Q-o-CTUv6q3Uwnhc67-wXy-
U4Q5O2GcOlPHG5UF6ay3YrcSF637QvL3calkdmX3l8iUrZpLR4yGuBeoMjHS3n
meHUXb3V11s2IYCR8UjN7__1nUzryPNyyCMmakBptz8suGHycNpncrkb0Il1majcV
xELGrw7AqwSF6leb2giALH5mpQnolDmVxH5Kio8uCttRLfdzn8Xvs4o7KM7P7R__
lSg3HdmrWNlgwuPv1__26sYzwLbW6IwchsDq__NNC7ufXA5E__LM0pmk__j__2QtIoN
2jsMiO0V-lb5vbBGO2E8DE__VcQN06-
o5Auw5Wuf4TmZqrQhFT77lAU55JC6lNv8nA.

Specifically custom entitlements in a signed mobile network ID token contains information about an identity and the phone numbers, the billing account, the type of accounts and the roles over those accounts. Following is an example of a decoded token with the following information:

{
  "iat": 1657567047,
  "exp": 1657574244,
  "iss": "https:// brass.account.mobile.com",
  "aud": "MYTMO",
  "AT": "14.USR.U0ZcorPsC651uL2SR",
  "sub": "U-0c540156-c600-4b03-849a-f6a88299be2b",
  "email": "test@email.com",
  "acr": "loa2",
  "amr": [
    "password"
  ],
  "usn": "f74e2fa32e14330a",
  "ent__type": "basic",
  "ent": {
    "acct": [
      {
        "id": "425326",
        "tst": "IR",
        "big__ban": false,
        "lines": [
          {
            "phnum": "9991112222",
            "activationDate":
"2021-08-11T19:41:16Z",
            "accountTypeSubType": "SL",
            "r": "R,DL,D"
          },
          {
            "phnum": "9991112223",
            "activationDate":
"2022-05-31T19:50:09Z",
            "accountTypeSubType": "IR"
          },
          {

-continued

```
                    "phnum": "9991112224",
                    "activationDate":
"2022-05-16T19:45:12Z",
                    "accountTypeSubType": "IR",
                    "r": "CAV"
                  }
                ]
              }
            ]
          }
        }
```

There are a few pieces of information in the example decoded token specifically within an entitlement. For example, the userid may be a unique identifier for the ID, which does not change, along with the issuer, audience, unique session number (usn). However, elements such as the email, entitlements that include the account ID (billing account number), tst (account type sub type), phone number details along with their roles, are all changing data elements. Under the "ent" structure, these are relationships to the ID, and since they can change, anytime a token is used, it cannot be assumes that the data is the same.

The MD5Hash of the token data is:

Key: SUB|EMAIL|ENT (using | symbol to separate fields since email contains a period '.')

U-0c540156-c600-4b03-849a-f6a88299be2b}test@email.com|{"acct": [{"id": "425326", "tst": "IR", "big_ban": false, "lines": [{"phnum": "9991112222", "activationDate": "2021-08-11T19:41:16Z", "accountTypeSubType": "SL", "r": "R,DL,D"}, {"phnum": "9991112223", "activationDate": "2022-05-31T19:50:09Z", "accountTypeSubType": "IR"}, {"phnum": "9991112224", "activationDate": "2022-05-16T19:45:12Z", "accountTypeSubType": "IR", "r": "CAV"}]}]}.

Thus, the techniques and architecture described herein provide a method within a wireless communication network, the method that comprises, based at least in part on sending a login associated with a phone number, receiving a code at an electronic device associated with the phone number. The method also comprises receiving a hash code corresponding to the code at an app executing on the electronic device associated with the phone number. The method further comprises receiving an input. The method also comprises, based at least in part on the input, hashing the input to provide a hashed code. The method further comprises, comparing the hashed code with the hash code. The method also comprises, based at least in part on comparing the hashed code with the hash code, determining if the hashed code matches the hash code.

The new hash becomes:

71c49b792a84d0ecb8e7b8873334e709.

If any element, for example the accountTypeSubType changes to PAH for the 1st line: U-0c540156-c600-4b03-849a-f6a88299be2b}test@email.com|{"acct": [{"id": "425326", "tst": "IR", "big_ban": false, "lines": [{"phnum": "9991112222", "activationDate": "2021-08-11T19:41:16Z", "accountTypeSubType": "PAH", "r": "R,DL,D"}, {"phnum": "9991112223", "activationDate": "2022-05-31T19:50:09Z", "accountTypeSubType": "IR"}, {"phnum": "9991112224", "activationDate": "2022-05-16T19:45:12Z", "accountTypeSubType": "IR", "r": "CAV"}]}]} then the new hash becomes a456581c7489a7a5193a0a468af2d2aa.

This now indicates if the token has changed without needing to loop through data. This may be used for token exchange or token validation/introspection, as will be discussed further herein.

Looking into the ID token, levels of synchronization assurance (LOSA) may be broken apart depending on the data that matters. For example, a hash of the entire entitlements structure may be with a default LOSA. In configurations, example LOSA definitions may include:

TABLE 2

| | | |
|---|---|---|
| LOSA4 (default) | SUB|EMAIL|ACR|ENT | Userid Email ACR Entitlements |
| LOSA3 | SUB|EMAIL|ENT.P|ENT.R | Userid Email Entitilement Phone Numbers, Roles |
| LOSA2 | SUB|EMAIL|ENT.P | Userid Email Entitlement Phone Numbers |
| LOSA1 | SUB|EMAIL | Userid Email |

In configurations, the LOSA may be a pre-determined algorithm that helps identify how likely the trust factor is that the identity is synchronized. This may be customized and can be helpful to require less for an authorization server to validate in terms of changes. Since ID tokens may have multiple claims, the LOSA concept allows a per-claim validation so that it is easy to check if the latest data is synchronized.

This concept may be used for resource endpoints as well. If a system must obtain more information such as a useimfo endpoint, the system may query details. This means if querying an API with a hash in the request, a resource server may decide to respond with an HTTP 304 (not modified). This indicates that there is no change from the initial request. This is powerful as it can allow more efficient caching on both a server side and a client side. The idea is that it is clear if data has changed and the client can assert its version of the data so that the server can decide if it has the latest information or not.

Checking each attribute for a change in value may be simplified by packaging critical elements such as, for example:

ID_SYNC: 6ae6f9baff4435bd98a567a245c1603d_1670891255_CC.BC.M.CT (contractcode.primarybillingaccountcode.msisdn.multi-Linecustomertype)

This may allow for a specific set of attributes from a resource endpoint to be sent in a request so that the server may reply with the hashed version of the same data in case it has changed.

Format of keys to hash: Scope[{Array of data}]

So AL (associated lines)—AL[{CC.BA.M.CT}] would be hashed like:

AL[{12345.112233.9990009999.PAH}, {12346.112233.9990009991.NPAH_P}]

The hash as an MD5 would become: b8bbdadea39c7954325152610b10784d

In configurations, critical elements may be packaged as part of a nomenclature to manage scope data:

Format of keys to hash: Scope[{Array of data}].Scope2[{Array of data}]

(note that the '.' Can be replaced by any separator—as long as its defined in the request)

Thus, as an example:

```
IP=iamProfile [ { Email.UserId.Firstname.Lastname }].Associated Lines =
AL[{contractcode.primarybillingaccountcode.msisdn.multiLinecustomertype}]
IP[{E.UID.FN.LN}}.AL[{CC.BA.M.CT}]
```

The hash may thus look like:

```
IP[{paceholder@email.com.U-
11223344.First.LAST}].AL[{12345.112233.9990009999.PAH}]
ID__SYNC:
33bb2897c801afe66491ea4612b3ddfe__1670910439__IP[{E.UID.FN.LN}}.AL[{CC.B
A.M.CT}]
```

From this, there is now a way to manage arrays of data and scopes so that a json response for a resource server may be hashed and sent as a header in response to the client to know if any critical data (or data that is expected) will fail. The concept of LOSA extends to this the same way, where different attributes and scopes may make up a defined LOSA level.

ID token signing allows for a secure method to ensure no changes have been made to the token. This helps ensure that trust based on the issuer is not broken and that the hash is correct and not manipulated.

Considering the previous example, the LOSA and synchronization hash may result in:

```
{
   "iat": 1657567047,
   "exp": 1657574244,
   "LOSA": "LOSA4",
   "UID__SYNC":
"71c49b792a84d0ecb8e7b8873334e709__1657567047__UID|EMAIL|ACR|ENT",
   "iss": "https:// brass.account.mobile.com",
   "aud": "MYTMO",
   "AT": "14.USR.U0ZcorPsC651uL2SR",
   "sub": "U-0c540156-c600-4b03-849a-f6a88299be2b",
   "email": "test@email.com",
   "acr": "loa2",
   "amr": [
      "password"
   ],
   "usn": "f74e2fa32e14330a",
   "ent__type": "basic",
   "ent": {
      "acct": [
         {
            "id": "425326",
            "tst": "IR",
            "big__ban": false,
            "lines": [
               {
                  "phnum": "9991112222",
                  "activationDate":
"2021-08-11T19:41:16Z",
                  "accountTypeSubType": "SL",
                  "r": "R,DL,D"
               },
               {
                  "phnum": "9991112223",
                  "activationDate":
"2022-05-31T19:50:09Z",
                  "accountTypeSubType": "IR"
               },
               {
                  "phnum": "9991112224",
                  "activationDate":
"2022-05-16T19:45:12Z".
                  "accountTypeSubType": "IR",
                  "r": "CAV"
               }
            ]
         }
      ]
   }
}
```

This ID token may then be wrapped and signed such that it can be trusted. Note that the issue time of the token matches the timestamp of the UID_SYNC hash, which suggests that there has been no change based on the issue time of the token in the next section.

In configurations, the requesting API may contain a header that may allow a LOSA that is being requested. This can then be added into the ID token.

ID Tokens returned from an IDP typically contain information dated with a specific timestamp.

There are two flows to help with token management with this concept: 1) Token Exchange and 2) Token Validation/Introspection. If a new token is exchanged, it can be determined if something has changed (instead of comparing information). If a refresh token is used, a header may be returned that indicates if anything has changed from the previous token. This allows a quick way to validate the data within the token has not changed (outside of the validity details like expiry and signature validation details). Similar to token exchanges, the concept of validation allows for quicker client side processing to determine if any data is out of synch. This suggests the token is still valid and with the UID_SYNC header, the server just has to validate that the data has not changed and a new token is not required. Internally, the token server may cache the synchronization header or decide to build it when the request arrives.

Most hashing algorithms may be used with the techniques described herein. The chances of collision are not a large concern as it is not necessary to compare hashes across different data sets. This is quite specific and unique to a single data set and with a timestamp it significantly reduces the chances of collision to be of no concern. This will allow for less heavy API calls to provisioning (ex: billing) or identity (ex: IDP) systems as they may only need to provide a response of the hash to ascertain whether an update is needed. This is significantly easier to maintain and reduces overhead.

In configurations, a use of an old or outdated hash may be used to trace security vulnerabilities, especially if a system is consistently using an old hash with a token. Transaction logging may help identify this with minimal increase in data.

If a token has been re-issued with the latest hash, an old hash use indicates an old token being used. While it is valid, it is a way to determine it is compromised.

This application of synchronization may be used across many industries. Examples here specifically indicate value with mobile network operators, but with any system looking to improve performance and simplify their synchronization model, the techniques and architecture described herein allow systems to effectively self-heal themselves as they are queried for information. There are two main advantages to this approach: 1) out of synchronization management and 2) efficient data management, e.g., less data processing.

Figure 2:
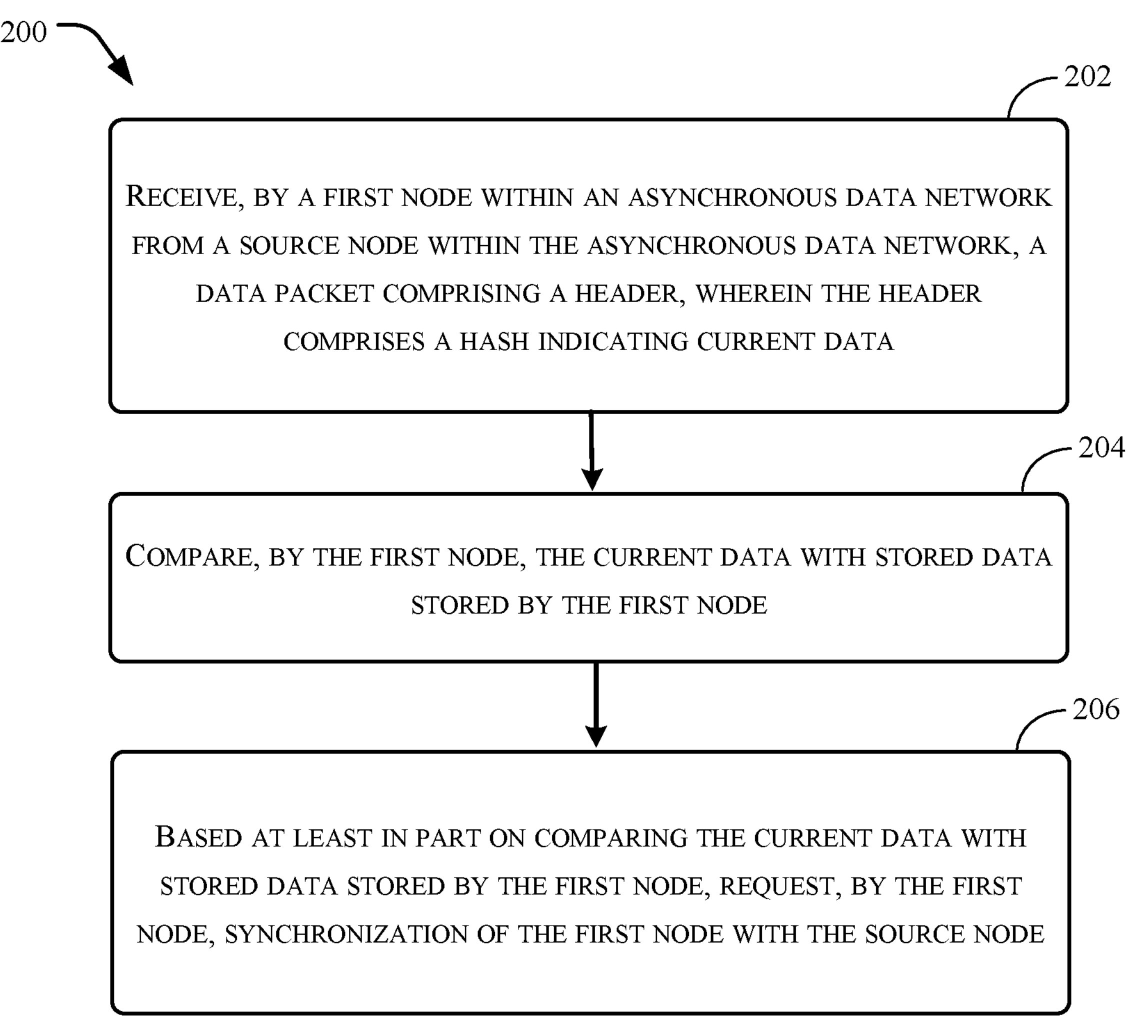
FIG. 2 is a flow diagram of an example process for use in synchronizing the systems of FIGS. 1A and 1B, in accordance with various configurations.

FIG. 2 is a flow diagram of an illustrative process that may be implemented within or in association with the examples of FIGS. 1A and 1B. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 2 is a flow diagram of an example process 200 for synchronizing the systems of FIGS. 1A and 1B, e.g., systems 102 and 106.

At 202, in configurations, a first node within an asynchronous data network receives from a source node within the asynchronous data network, a data packet comprising a header, wherein the header comprises a hash indicating current data.

At 204, the first node compares the current data with stored data stored by the first node.

At 206, based at least in part on comparing the current data with stored data stored by the first node, the first node requests synchronization of the first node with the source node.

While the techniques and architecture described herein have been primarily described with respect to a wireless communication network, those skilled in the art will recognize that the techniques and architecture are equally applicable to other types of networks that utilize asynchronous systems.

Figure 3:
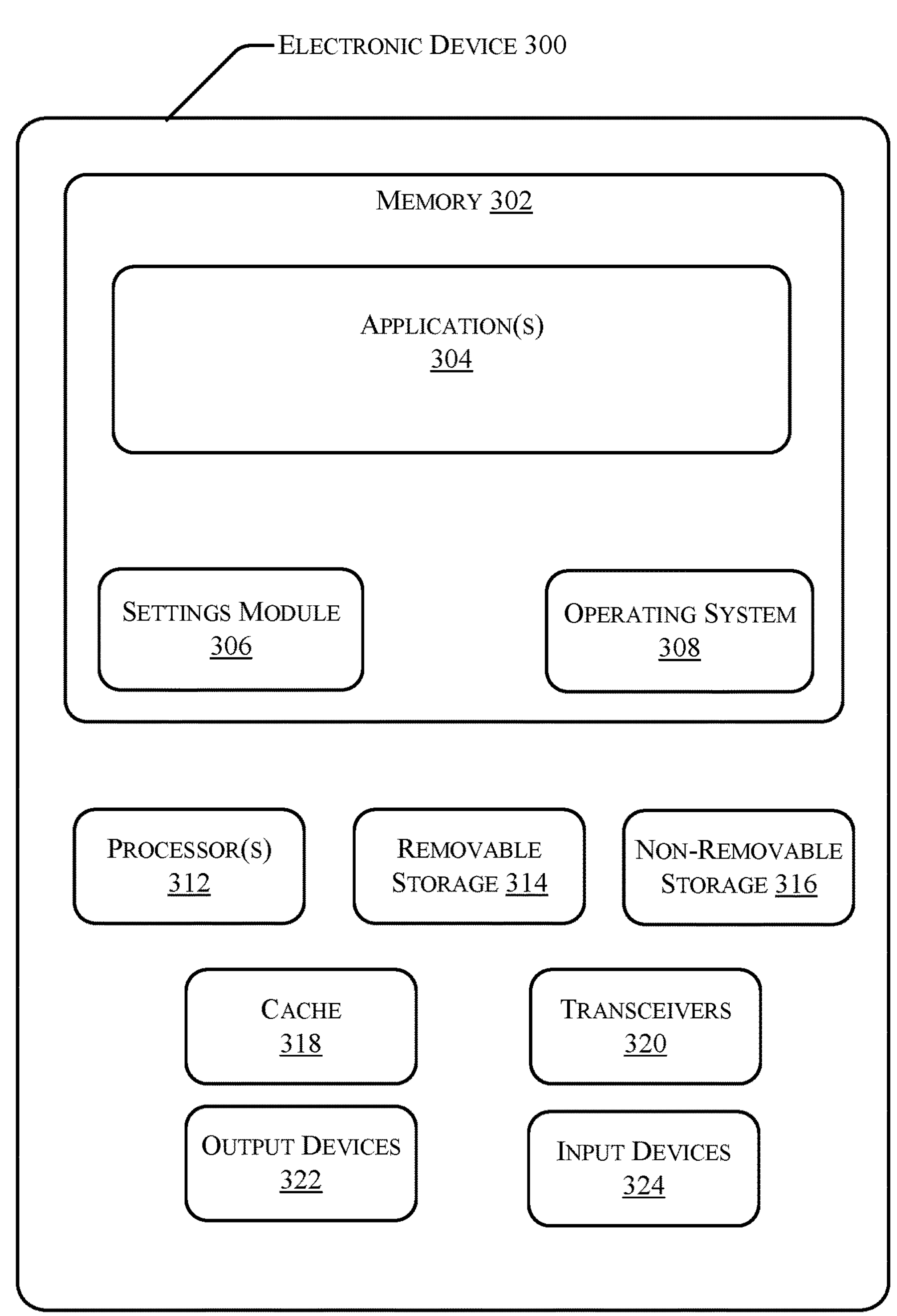
FIG. 3 schematically illustrates a component level view of an example electronic device configured for use with the systems of FIGS. 1A and 1B, in accordance with various configurations.

FIG. 3 schematically illustrates a component level view of an apparatus in the form of an example electronic device 300 that may be used to implement, for example, source system 106 and/or systems 106*a*, 106*b*, and/or 106*c*. The electronic device 300 may include more or less components depending on the type of electronic device. As illustrated, the electronic device 300 comprises a system memory 302, e.g., computer-readable media, storing application(s) 304. For example, the system memory 302 may include one or more application(s) (app(s)) 304 configured to implement one or more functions with respect to synchronization described herein. The mobile device also comprises a settings module 306, and an operating system 308. Also, the electronic device 300 includes processor(s) 312, a removable storage 314, a non-removable storage 316, cache 318, transceivers 320, output device(s) 322, and input device(s) 324. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The electronic device 300 may also include additional data storage devices (removable and/or non-removable) such as, for example, magnetic disks, optical disks, or tape. Such additional data storage may include removable storage 314 and non-removable storage 316. Additionally, the electronic device 300 includes cache 318.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 300. Any such non-transitory computer-readable media may be part of the electronic device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna (not shown). Also, or alternatively, the transceivers 320 may include wireless modem(s) to facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a key board/keypad, or a touch-sensitive display. A key board/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the electronic device 300 to define how the user wishes certain calls from third parties to be handled by the wireless communication network, as previously described herein.

Some or all operations of the processes described above can be performed by execution of computer-readable instructions stored on a computer storage medium, as defined below: The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Memory 302 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may various perform operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
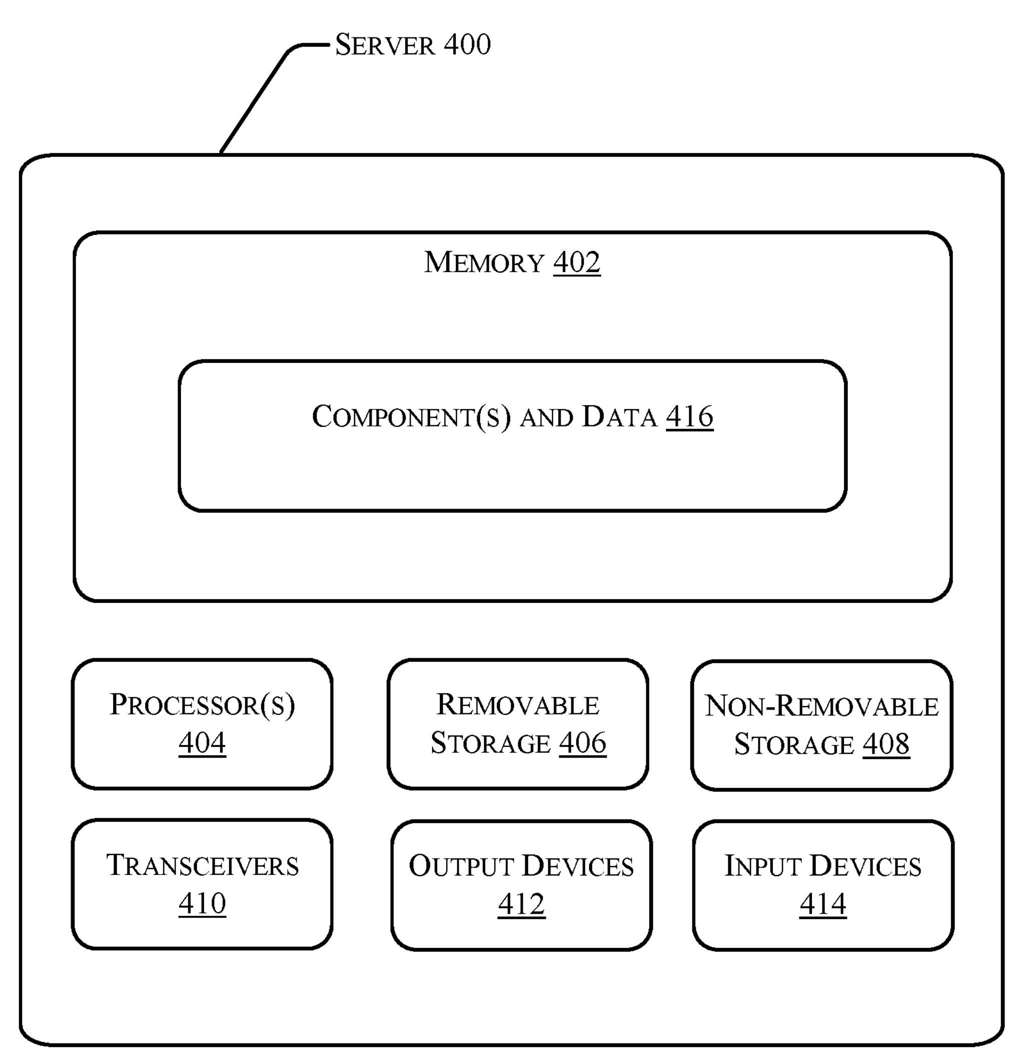
FIG. 4 schematically illustrates a component level view of a server configured for use with the systems of FIGS. 1A and 1B, in accordance with various configurations.

FIG. 4 illustrates a component level view of an apparatus in the form of an example server 400 that may be used to implement, for example, source system 106 and/or systems 106*a*, 106*b*, and/or 106*c*, according to the techniques described herein.

As illustrated, the server 400 comprises a system memory 402 that may store one or more components, modules, and/or applications and data 416 for interacting with electronic devices 300, or other electronic devices that may be configured as connected devices, as described herein. Also, the server 400 may include processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.), or some combination of the two. In some implementations, the processor(s) 404 is a Central Processing Unit (CPU), a Graphics Processing Unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable storage 408 may include module(s) and data 416 (illustrated in the memory 402). The module(s) and data 416 may include instructions executable by, for example, the processor(s) 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also, or instead of, the transceivers 410 may include wireless modem(s) to facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Memory 402 and memory 402 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1A, 1B, and 2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

receiving, by a first node within an asynchronous data network from a source node within the asynchronous data network, a data packet comprising a header, wherein the header comprises a value concatenating a hash of a subset of data elements from a plurality of data elements, a timestamp, and a key, the key identifying which data elements from the plurality of data elements comprise the subset of data elements that are hashed, wherein the key is encrypted;

comparing, by the first node, the current data with stored data stored by the first node; and based at least in part on comparing the current data with stored data stored by the first node, requesting, by the first node, synchronization of the first node with the source node.

2. The method of claim 1, wherein the header further comprises an index.

3. The method of claim 1, wherein the hash is related to a data element.

4. The method of claim 1, wherein the hash is related to an identity token.

5. The method of claim 4, wherein the identity token is signed.

6. The method of claim 1, wherein the hash is related to a resource endpoint.

7. The method of claim 1, further comprising:

determining that the hash is an outdated hash.

8. An apparatus comprising:

one or more processors; and instructions being executable by the one or more processors to cause the one or more processors to perform actions comprising:

receiving, by a first node within an asynchronous data network from a source node within the asynchronous data network, a data packet comprising a header, wherein the header comprises a value concatenating a hash of a subset of data elements from a plurality of data elements, a timestamp, and a key, the key identifying which data elements from the plurality of data elements comprise the subset of data elements that are hashed, wherein the key is encrypted;

comparing, by the first node, the current data with stored data stored by the first node; and based at least in part on comparing the current data with stored data stored by the first node, requesting, by the first node, synchronization of the first node with the source node.

9. The apparatus of claim 8, wherein the header further comprises an index.

10. The apparatus of claim 8, wherein the hash is related to a data element.

11. The apparatus of claim 8, wherein the hash is related to an identity token.

12. The apparatus of claim 11, wherein the identity token is signed.

13. The apparatus of claim 8, wherein the hash is related to a resource endpoint.

14. The apparatus of claim 8, wherein the actions further comprise:

determining that the hash is an outdated hash.

15. One or more non-transitory computer storage media comprising instructions stored thereon, the instructions being executable by one or more processors to perform actions comprising:

receiving, by a first node within an asynchronous data network from a source node within the asynchronous data network, a data packet comprising a header, wherein the header comprises a value concatenating a hash of a subset of data elements from a plurality of data elements, a timestamp, and a key, the key identifying which data elements from the plurality of data elements comprise the subset of data elements that are hashed, wherein the key is encrypted;

comparing, by the first node, the current data with stored data stored by the first node; and based at least in part on comparing the current data with stored data stored by the first node, requesting, by the first node, synchronization of the first node with the source node.

16. The one or more non-transitory storage media of claim 15, wherein the header further comprises an index.

* * * * *